US010009358B1

(12) United States Patent
Xie et al.

(10) Patent No.: US 10,009,358 B1
(45) Date of Patent: Jun. 26, 2018

(54) GRAPH BASED FRAMEWORK FOR DETECTING MALICIOUS OR COMPROMISED ACCOUNTS

(71) Applicant: DataVisor Inc., Santa Clara, CA (US)

(72) Inventors: Yinglian Xie, Cupertino, CA (US); Fang Yu, Sunnyvale, CA (US)

(73) Assignee: DataVisor Inc., Mountain View, CA (US)

( * ) Notice: Subject to any disclaimer, the term of this patent is extended or adjusted under 35 U.S.C. 154(b) by 0 days. days.

(21) Appl. No.: 14/620,048

(22) Filed: Feb. 11, 2015

Related U.S. Application Data

(60) Provisional application No. 61/938,624, filed on Feb. 11, 2014.

(51) Int. Cl.
*H04L 29/06* (2006.01)
*G06N 99/00* (2010.01)

(52) U.S. Cl.
CPC .......... *H04L 63/14* (2013.01); *G06N 99/005* (2013.01)

(58) Field of Classification Search
CPC .......................... H04L 63/0263; H04L 63/14
See application file for complete search history.

(56) References Cited

U.S. PATENT DOCUMENTS 5,712,793 A * 1/1998 Scepanovic ......... G06F 17/5072 716/124
7,668,957 B2 * 2/2010 Achlioptas .......... G06Q 10/107 709/203
8,285,536 B1 * 10/2012 Kumar ................ G06F 17/2809 704/2
8,418,249 B1 * 4/2013 Nucci .................. G06F 21/552 706/20
9,148,441 B1 * 9/2015 Tamersoy .......... H04L 63/1416
9,183,387 B1 * 11/2015 Altman ................ G06F 21/554
2004/0133536 A1 * 7/2004 Uceda-Sosa ...... G06F 17/30604
2009/0129599 A1 * 5/2009 Garcia ................... H04L 9/083 380/279
2009/0228296 A1 * 9/2009 Ismalon ................ G06Q 30/02 705/319
2010/0095374 A1 * 4/2010 Gillum .................. G06Q 30/02 726/22
2012/0137367 A1 * 5/2012 Dupont .................. G06F 21/00 726/25
2014/0095689 A1 * 4/2014 Borgs ............... G06F 17/30958 709/224
2014/0317736 A1 * 10/2014 Cao .................... H04L 63/1483 726/23
2015/0047034 A1 * 2/2015 Burnham ........... H04L 63/1425 726/23

* cited by examiner

*Primary Examiner* — Saleh Najjar
*Assistant Examiner* — Devin E Almeida
(74) *Attorney, Agent, or Firm* — Fish & Richardson P.C.

(57) ABSTRACT

Methods, systems, and apparatus, including computer programs encoded on computer storage media, for detecting malicious attacks. One of the methods includes generating a collection of hypergraphs representing user events across a collection of users; analyzing the collection of hypergraphs to determine a group of malicious user accounts or account activities satisfying a threshold confidence; using the group of malicious user accounts or account activities as training data for a machine learning system that generates one or more classifiers; and using the one or more generated classifiers to output additional malicious user accounts or account activities.

16 Claims, 8 Drawing Sheets

GRAPH BASED FRAMEWORK FOR DETECTING MALICIOUS OR COMPROMISED ACCOUNTS

CROSS-REFERENCE TO RELATED APPLICATIONS

This application claims the benefit under 35 U.S.C. § 119(e) of the filing date of U.S. Patent Application 61/938,624, which was filed on Feb. 11, 2014, and which is incorporated here by reference.

BACKGROUND

This specification relates to detecting malicious accounts.

The flourish of online services has attracted numerous attackers to conduct a wide range of nefarious activities, ranging from spam posts, phishing emails, fake invitations, cheated games, artificially promoted ads, to fraudulent financial transactions. Recent observations have identified an increased number of attacks of different forms, affecting online services of all sizes, for example, ranging from millions of compromised accounts to hundreds of millions fake accounts being crated on various social networking sites and numerous small online forums.

Although each attack may look different in scale and method, a common thread typically found among them is the requirement of a large number of malicious user accounts. These accounts can either be newly created or can be obtained by compromising real user accounts. Guarding the legitimate accounts and detecting malicious accounts is thus ultimately critical to ensure the success of all online services.

SUMMARY

The present specification provides a big-data analysis framework to detect malicious and compromised accounts early without the need of relying on historical or labeled training data. The framework is based on large graph analysis and machine learning techniques. It first constructs a set of hyper-graphs to represent user activities and performs large-scale graph analysis to determine a subset of malicious accounts and activities with high confidence. The set of detected high-confidence malicious accounts and activities are then used as self-generated training data to feed into machine learning components to derive a set of risk models or a set of classifiers. Finally, these newly generated risk models or classifiers can be used to detect the remaining set of undetected user accounts or account activities. In this framework, the graph analysis bootstraps the system to automatically generate training data on demand, without relying on historical training data obtained from manual labels or external detection components. As such, early detection of malicious users and user activities in an unsupervised manner can be achieved.

The input to the system includes Web logs that are readily available from services. Example inputs can include sign-in and sign-up logs. Other example inputs can include e-commerce transaction logs, online purchase logs, comment or review post logs, e.g., commonly available for social sites. The system can be implemented on commonly available computer systems without the need of special hardware. The system can be deployed in a cloud-computing environment, whereas it receives events or event logs from other service providers or end users directly.

Through big-data analysis, the system automatically generates a set of malicious fake accounts, compromised accounts, and malicious account activities (e.g., spam, phishing, fraudulent transactions or payments). In addition, the system can also generate a set of risk models or classifiers to detect future events or user accounts either in real time or through periodic offline batch analysis.

In general, one innovative aspect of the subject matter described in this specification can be embodied in methods that include the actions of generating a collection of hypergraphs representing user events across a collection of users; analyzing the collection of hypergraphs to determine a group of malicious user accounts or account activities satisfying a threshold confidence; using the group of malicious user accounts or account activities as training data for a machine learning system that generates one or more classifiers; and using the one or more generated classifiers to output additional malicious user accounts or account activities. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Each hypergraph includes nodes corresponding to a feature profile associated with user accounts or events and edges indicating a relationship between nodes. Analyzing the collection of hypergraphs to determine a group of malicious user accounts or account activities includes: applying one or more community detection techniques to the hyper graphs to identify suspicious sub-graph components; determining that the nodes associated with the suspicious sub-graph components are suspicious; and outputting accounts or events associated with the suspicious sub-graph components as candidate malicious accounts or events. The method further includes examining the candidate accounts or events using a set of one or more rules or a whitelist to filter potential false positive accounts or events. Analyzing the collection of hypergraphs to determine a group of malicious user accounts or account activities includes: assigning a suspiciousness score to each node of the hypergraphs, wherein each node corresponds to a feature profile associated with user accounts or events; applying one or more graph diffusion techniques to the hyper graphs; and selecting a set of one or more nodes with high suspiciousness scores as candidate malicious accounts or events. Generating the collection of hypergraphs includes obtaining event log data associated with the collection of users including one or more of login logs, signup logs, or transaction logs. Using the group of malicious user accounts or account activities as training data for a machine learning system that generates one or more classifiers further includes obtaining additional user accounts or account activities to use as good training data. The good training data and group of malicious user accounts or account activities are used to derive a set of rich features used to generate the one or more classifiers. The method further includes using the output additional malicious user accounts or account activities to derive a set of signals to combine with the one or more classifiers to provide real-time detection of future user events or user accounts In general, one innovative aspect of the subject matter described in this specification can be embodied in methods that include the actions of receiving input data, the input data including event logs for a collection of users; processing the input data according to each of: an IP-stat process, wherein the IP-stat process generate a set of IP address properties from the input data; and a user-stat process, wherein the IP-stat process generates a set of statistics and features for each user of the collection of users from the input data; and providing the processed input data to one or more detection modules that analyze the processed input data to perform attack detection. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The one or more detection modules include one or more of machine learning modules, graph-based modules, or rule-based modules.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Conventional defense systems focus on the last stage of the attacks for detection, i.e., when the malicious accounts are actually used to abuse service and perform attacks, for example, posting ads, spamming, abusing computation resources on cloud-computing environments, or performing fraudulent transactions. As attack formats and methods frequently evolve, it is often difficult to detect new attacks.

Therefore, most of the conventional detection systems are reactive. They typically are effective only after the attack has happened; in particular after the new attack patterns have been observed and learned by manual efforts. For example, by examining new fraudulent transactions or spam campaigns, human experts can derive new rules or generate new content signatures. These solutions have drawbacks, for example: 1) The solutions are often effective after attackers have conducted malicious activities. So damage may have already occurred. Even if the systems effectively detected these accounts and blocked them, it may not impact the attack eco-system because attackers can always sign up free new accounts again with a low cost. 2) The detection results are often incomplete. Such solutions can detect only actively attacking accounts, while missing a large number of malicious accounts that are still in various incubation stages.

In addition, most attack detection systems work in isolation. 1) They usually examine each event individually, losing the power of a global view to detect large-scale, coordinated attacks. 2) They often rely on experts to manually create rules or other attack signatures. As attacks get increasing stealthy, it is difficult for human experts to manually discover new sophisticated attack patterns that involve many different types of events and steps. 3) They often rely on many application specific signals, such as post contents or financial transaction details. These signals are specially crafted for each service and site. They are hard to transfer to other systems.

In contrast with the conventional attack detection systems, the systems and techniques described in the present specification specifically focus on account security. The aim is to secure every "good" user's account and detect all attacker-created malicious accounts.

Figure 1:
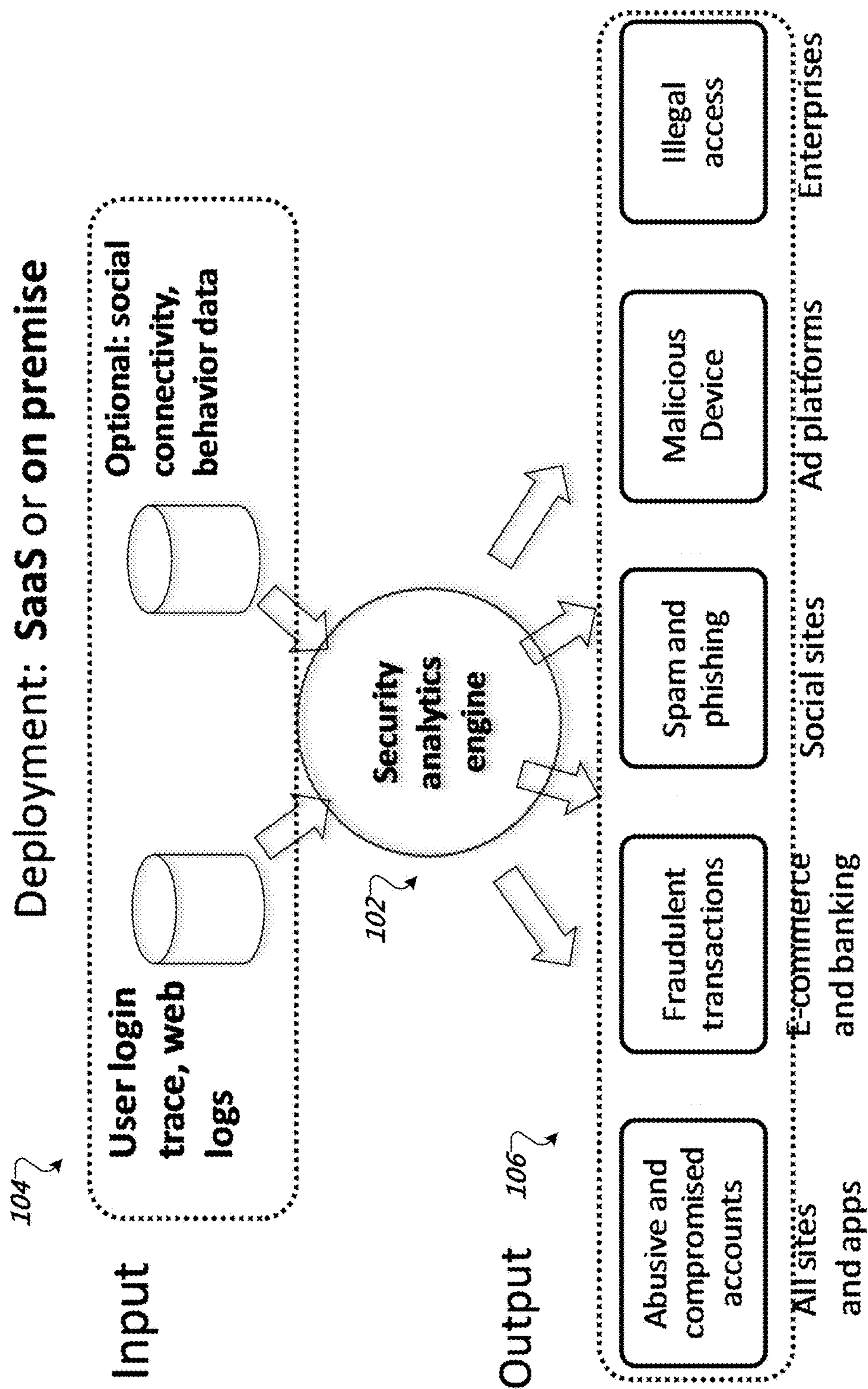
FIG. 1 is a diagram of an example system framework.

FIG. 1 illustrates the system framework at a high level. The core of the framework is an account-security analytics engine 102 that performs big-data analysis for detection. In particular, the account-security analytics engine 102 receives inputs 104 including user login information and in some implementations social connectivity data and behavior data. The outputs 106 of the account-security analytics engine 102 can include an identification of abusive and compromised accounts, fraudulent transactions, spam/phishing posts and fake reviews, and/or malicious devices.

Inputs

The analytics engine receives user event logs as inputs. Example logs include user login log, signup log, or transaction logs. Example fields for each event include:

1. Event type: e.g., sign-up, login, post-comment, payment
2. Event success: 0 or success 1 for failure (optional)
3. User name or user identifier (ID) (can be annoymized)
4. Login timestamp
5. Login IP address Among these fields, the user IDs can be anonymized. However, the anonymization process is configured to preserve a 1-1 mapping between the real user ID and an anonymized user ID, so that the system can keep track of a user's activity. Additionally, in some implementations, the engine may obtain meta-data regarding one or more user events. The meta-data are not required, but can help increase the detection coverage and accuracy.

Example fields of the meta-data include:

1. User-agent of the event
2. For a transaction event, the transaction amount, and the associated payment or purchase information (e.g., Paypal account ID or purchased products). The system does not require credit card or bank account information.

TABLE 1

Table 1 below illustrates the example input data to the analytics engine:

| Event ID | Event type | Event success | UserID | Timestamp | IP address |
|---|---|---|---|---|---|
| 1 | Login | 0 | HE12BN | Nov. 20, 2013 12:35:06 | 128.2.34.5 |
| 2 | Signup | 1 | AXV34K | Nov. 20, 2013 13:05:35 | 100.25.7.39 |
| 3 | Post | 1 | G8VB0M | Nov. 21, 2013 09:11:47 | 23.9.44.37 |

Output

Figure 2:
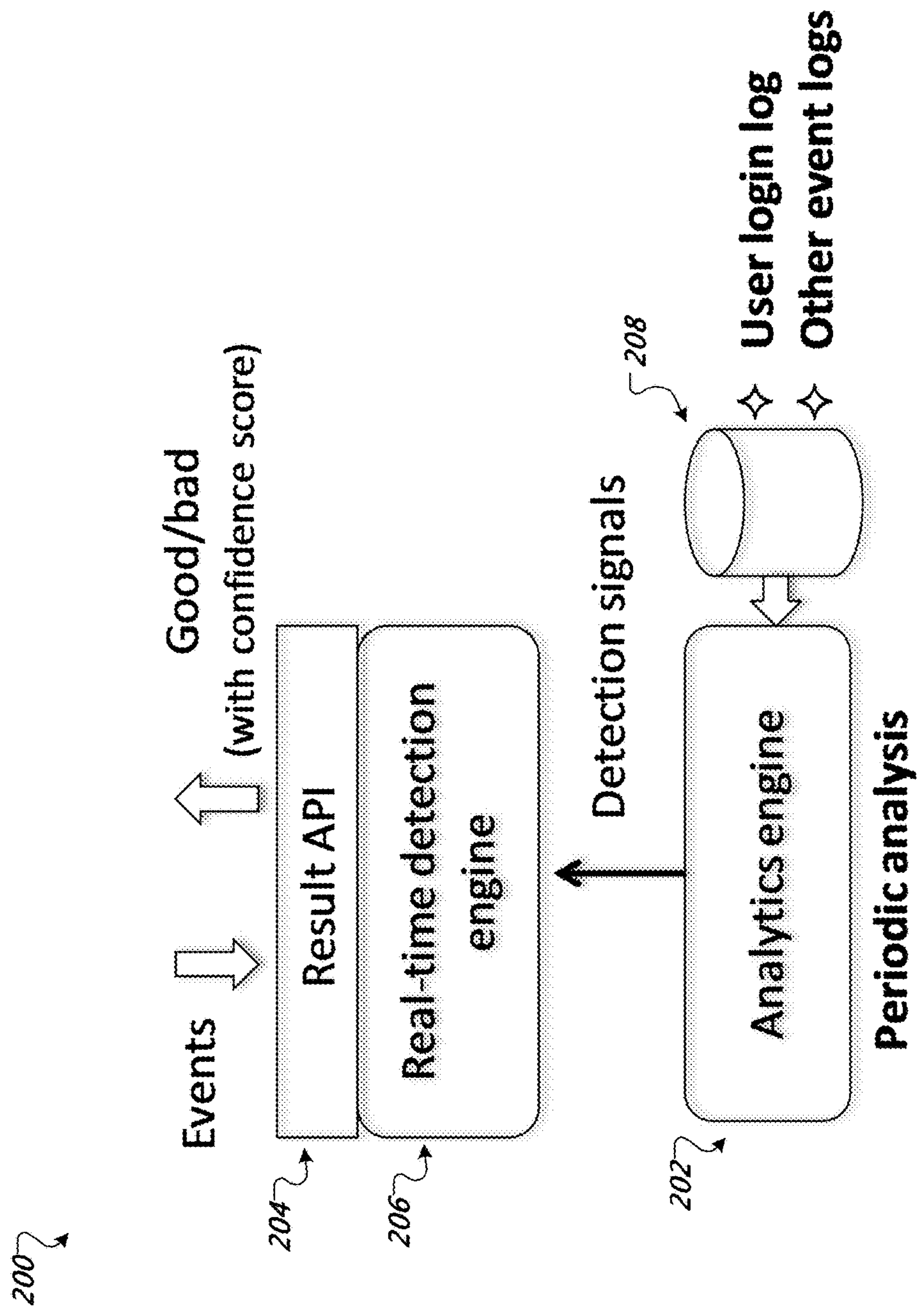
FIG. 2 is a diagram of an example decision-API model.

The analytics engine can generates different types of outputs, depending on the deployment model. The analytics engine 202 collects event data for a collection of users using log information. The simplest deployment model is through decision-API 200 as shown in FIG. 2. In this model, an analytics engine 202 takes event in real time through a result API 204 and, using the real-time detection engine 206, returns a score. The score is calculated using at least in part the prior collected log events 208. The score indicates a confidence of this particular event being associated with malicious activities.

Figure 3:
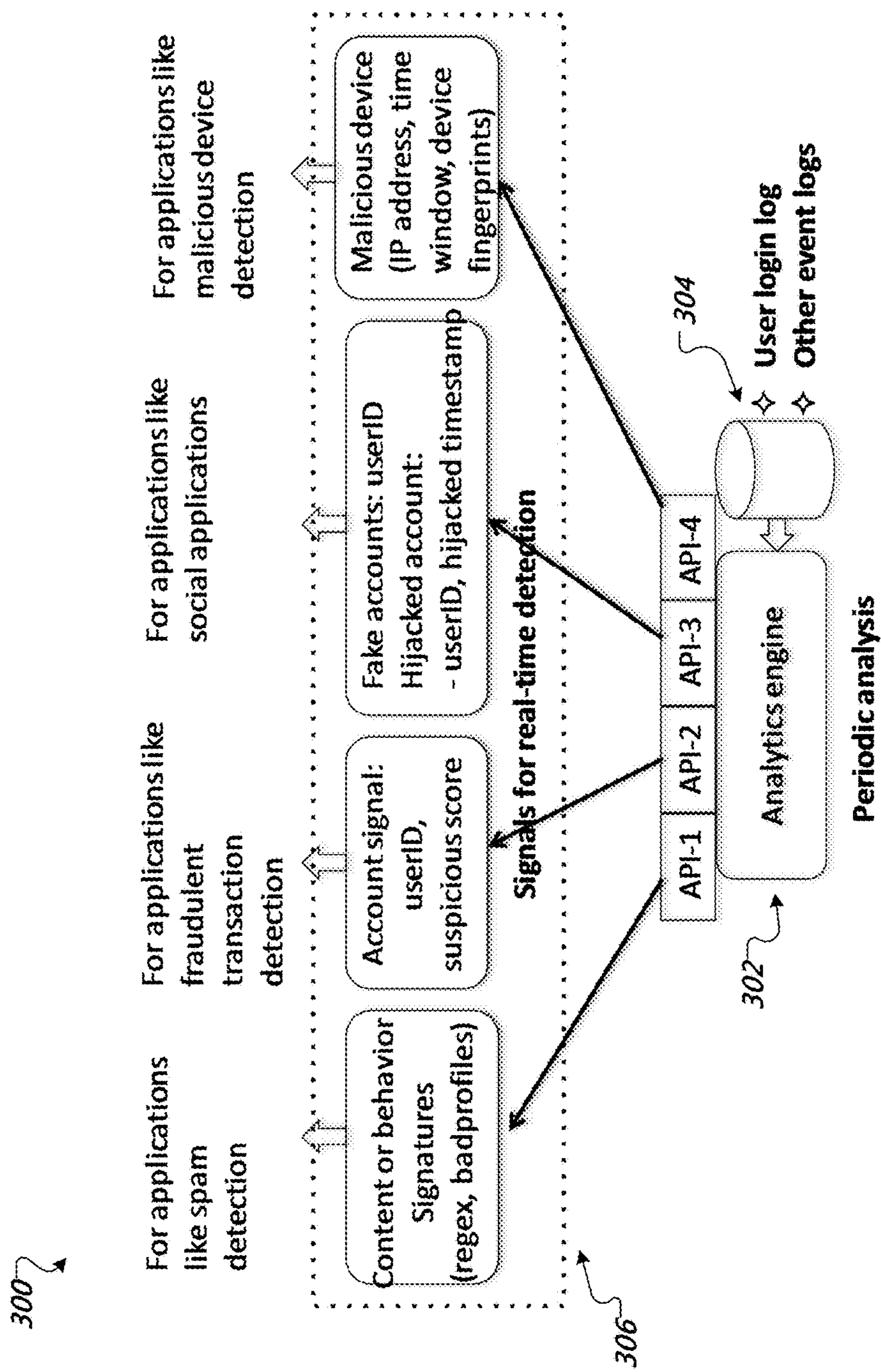
FIG. 3 is a diagram of an example signal-API model.

Another deployment model is through signal-API 300 as shown in FIG. 3. In this model, the analytics engine 302 periodically takes offline logs 304 or alternatively takes events in real time. The output results are in the form of a set of signals 306, to be used for real-time detection. The signals may be customized according to the types of attacks. These output signals may be combined with other signals for detection jointly. Table 1 below shows example output signals:

TABLE 1

Example output signals for signal-API deployment

| | |
|---|---|
| Spam-post detection | Regular expression based content signatures, suspicious user profiles or campaign signatures |
| Fraudulent payment detection | <suspicious userID, detection confidence score> list |
| Hijacked account detection | <hijacked userID, earliest attack timestamp> list |
| Fake account detection | Fake account ID list |

Modules and Process Flow

The analytics engine performs the following three types of analysis to perform early detection of malicious accounts and compromised user accounts: host property analysis, graph analysis, and machine learning based detection.

The host property analysis module takes event logs as input, and automatically generates IP address properties that can lead to the detection of botnet hosts, attack proxies, and dedicated attack hosts, all from input event logs.

The graph analysis module constructs and analyzes several types of activity graphs. A global view of the connectivity structures among users and events is important for early detection of stealthy attack patterns that are difficult to identify when each user or event is examined in isolation.

Based on the host property analysis and graph analysis results, the analytics engine selects activity features and generates attack models that can be fed into real-time detection using a machine-learning framework. The machine-learning framework generates a set of risk models and classifiers that can be used for detecting undetected accounts or activities, as well as future accounts or events. Finally, based on the specific attack methods and scales, the analytics engine may further generate different signals and signatures for real-time detection. For example, for content spam attacks, the engine may generate content-based signatures as well as user behavior patterns to capture attack campaigns. For fraudulent transaction attacks, the engine may generate a list of suspicious accounts for blocking their future transactions, with a detection confidence score for each account.

Figure 4:
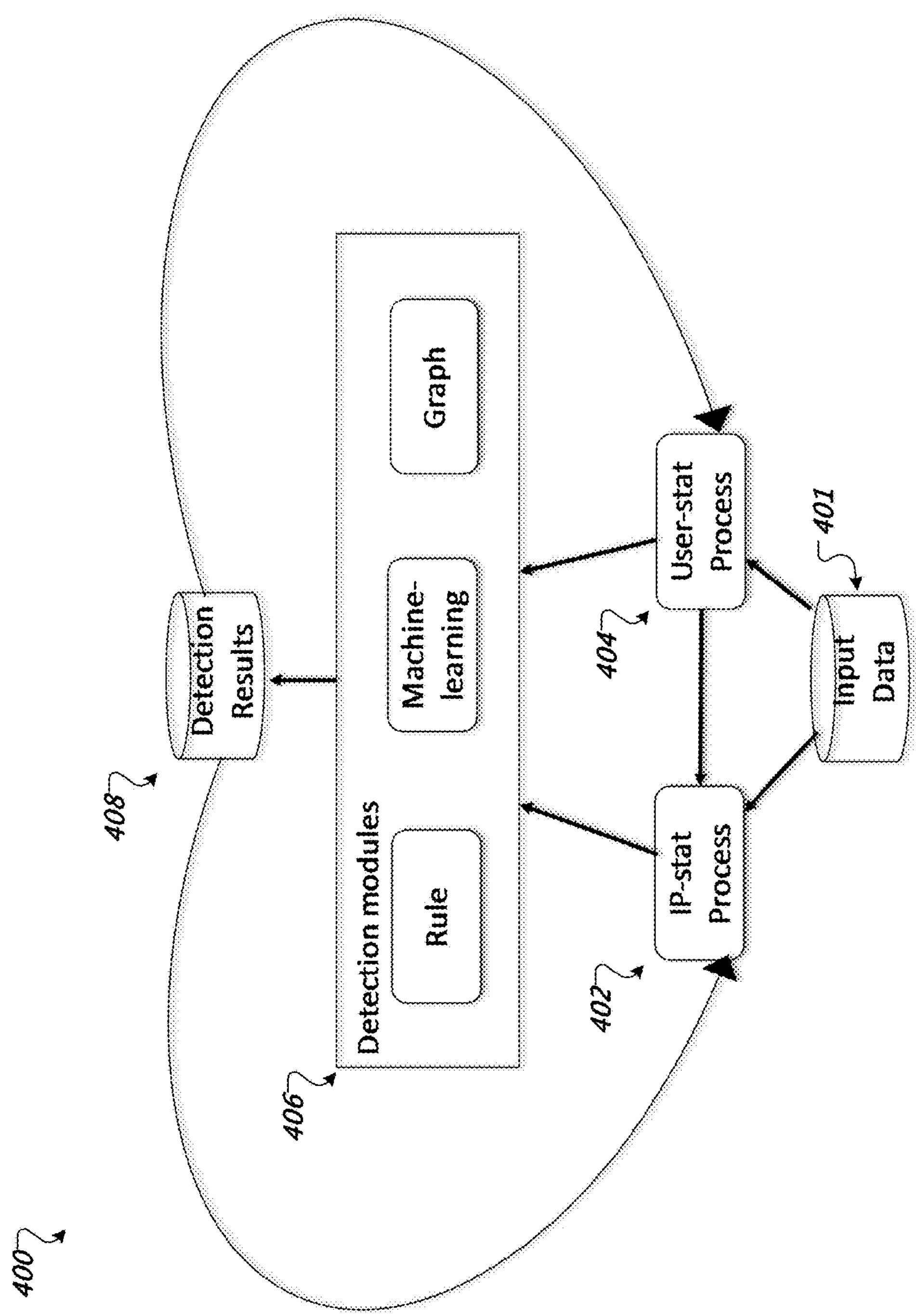
FIG. 4 shows an example overall processing flow of the system.

FIG. 4 shows an example overall processing flow 400 of the system. There are two independent modules that read the input data 401—an IP-stat process module 402 and a user-stat process module 404. Besides the input data 401, optionally, these modules can also read each other's outputs for extra information.

The IP stat process builds a rich set of IP (Internet Protocol) address properties, such as user population size and proxy information. The user stat process computes a set of statistics and features regarding each user, such as the user's registration age, the number of logins, the number of failed logins, the login velocity or rate of login over a specified time period, and user's predictable IP ranges, etc.

Given the IP stats and the user stats, one or more detection modules 406 further analyzes the output IP and user statistics/features to perform attack detection. There can be different types of detection modules. The simplest type of detection module is a rule-based detection module. More advanced detection modules can be machine-learning based or graph-based modules that work alone or in combination.

The output detection results 408 can be fed to the online service directly or fed to the frontend realtime detection engines. In addition, the output results 408 can also be fed back to the IP stat process module and user stat process module to update the computed states. As an example, the IP-stat process module 402 records how many detected bad users/events for each related IP address and IP address range. The user-stats process module 404 records the set of users that are detected as malicious accounts or compromised accounts.

Graph Analysis

A key component of the detection engine is graph analysis, where the system constructs activity graphs and identifies suspicious graph components. The graph analysis process allows the system to derive a global view of the correlations among user activities and various seemingly unrelated events, so that the system can detect stealthy attack patterns that may be difficult to identify when they are examined in isolation.

The system constructs different types of activity graphs, referred to in this specification as hypergraphs. Each node on a hyper graph corresponds to a feature profile computed from a set of correlated events or a set of correlated users, with edge attributes specifying their similarity or correlation relationship.

Through graph analysis, the detection engine can output groups of malicious accounts without requiring labeled data provided by the customers. The labeled data are often hard to obtain, especially with new, unseen attacks. With graph analysis, the system can self-bootstrap with an initial list of malicious accounts or events. This step also has the ability to capture new attack campaigns automatically. This initial list of malicious accounts or events can then be used as input to feed into the machine learning system for detecting more malicious accounts or more malicious events.

One technique for detecting an initial list of malicious accounts or events from the hypergraphs is to identify suspicious sub-graph components. On top the constructed hypergraphs, the system applies community detection techniques and identifies suspicious sub-graph components where a large number of graph nodes in the components are marked as suspicious individually (for example, by comparing the percentage of suspicious nodes with a pre-set threshold). In such case, it is likely that all the nodes from the suspicious sub-graph components are suspicious, even though some of them may not look suspicious when they are examined in isolation. The system can thus output all the accounts or events corresponding to these suspicious sub-graph components as candidates for further examination.

Another technique for detecting an initial list of malicious accounts or events from the hypergraphs is to assign a suspiciousness score to each node, and then to apply one or more graph diffusion techniques. The graph diffusion process will infer a suspiciousness score for each graph node according to the graph structure, based on the set of nodes with pre-assigned scores. After performing graph diffusion, the system can pick the set of nodes with high suspiciousness scores to output as candidates for further examination.

Finally, these identified suspicious candidate accounts or events may be further examined using a set of one or more rules or a whitelist to filter potential false positive accounts or events. For example, one rule could be to examine whether an output suspicious account is (1) an old user, and (2) the account has a feature profile does not fit well with the feature profile of the suspicious graph node (since a node's feature profile may be computed from a set of users). If a suspicious account matches this rule, the account may be a false positive case.

Machine Learning after Graph Analysis

The above graph analysis process can provide a subset of malicious events and malicious (or compromised) accounts without using historical labeled data. These already detected events and accounts can serve as bad training data, i.e., examples of malicious accounts or events, to detect the remaining set of users and events that have not been classified yet. This additional step of detection can be accomplished using a machine learning method.

To detect a larger set of malicious or compromised accounts and events, the already detected accounts and events serve as bad training data. To pick good training data, i.e., examples of non-malicious accounts or events, there could be several applied techniques. One technique is to randomly sample the remaining set of unclassified accounts or events. If majority of the unclassified accounts and events are good accounts and events, random sampling is likely to generate mostly good accounts and events. Another technique is to sample a subset of unclassified accounts or events with certain features, for example, registered long time back or performed good actions, to increase the likelihood of sampling good accounts. The remaining set of un-sampled accounts and events will be used as testing data.

Once the training accounts or events are generated, they can be used to derive a set of rich features. Each account or event can be represented as a feature vector that can be fed into a machine-learning framework to generate risk models or classifiers for detection. Example features include the account login count, the account lifetime, the number of IP addresses used by the account. There can be many more other suitable derived features.

Example machine learning methods, for example, support vector machines (SVM) or Random Forest classifications may be used to derive a classifier based on the input feature vectors. The derived classifier may be used to apply to the feature vectors constructed from testing data for classification. The classifier will output a set of feature vectors classified as bad. The corresponding user accounts and events, combined with the set of user accounts and events detected from graph analysis, will be output as malicious (or compromised) accounts and malicious events.

This auto-learning approach detects a larger set of malicious accounts or activities than the set of users or activities detected through graph analysis. It provides an automatic technique of generating risk models or classifiers across different applications or web sites without the need of manually generating rules or hand-tuning parameters and thresholds.

Risk Model and Signal Generation

Using the list of output malicious (or compromised) accounts and events, the system can further derive a set of signals to combine with the classifiers or risk models for real-time detection of future events or accounts. For different service sectors (e.g., gaming sites, e-commerce sites, social sites), the signals for real time detection may be different. For example, for content spam attacks, content-based signatures such as important keywords, n-grams, or regular expressions can be generated to capture new spam or ad campaigns. For fraudulent transaction attacks, user behavior patterns or the list of user accounts, each with a confidence score can be generated to block fraudulent transactions from such users in real time. These signals can be combined with other signals (e.g., generated via other means or from external parties) for real-time detection.

Key Differentiators

The key differentiators of the system from conventional solutions include:

Automatic Risk-Model Generation Vs. Manual Rule Derivation

Through big data analysis, the system automatically generates risk models for detection. It does not require human experts to write specific rules. More importantly, it does not require training data in terms of labeled attacks from providers. Such training data are often difficult to generate in the first place, especially for new, unseen attacks.

Proactive Detection Vs. Reactive Detection

Through studying user signup and login patterns, the system can detect subtle signals at early attack stages. Hence, it can proactively stop attacks before any damage has been generated. In many cases, the system can detect malicious accounts at even their account sign up time or the first login time. In contrast, conventional solutions mostly detect malicious accounts after they are used to perform activities, where loss may have already taken place.

Global View Vs. Individual Event Process

Legitimate user behaviors are highly diversified and it is usually difficult to capture their behaviors using one common model. On the other hand, malicious accounts attempt to mimic legitimate user behaviors in order to evade detection. For example, each account may be used to perform only one or two transactions, and each IP address may only be used for one or two malicious accounts. Therefore, when we examine individual users in isolation, it is often difficult to distinguish malicious activities from legitimate ones accurately.

The system leverages the observation that modern attacks are usually large-scale, coordinated. Instead of examining events in isolation, it analyzes the correlations among a large number of events and accounts to identify large-scale stealthy attacks. With such a global view, the system can identify groups of malicious accounts that are controlled by the same set attackers in a batch, even if these accounts were sent to log in from distributed IP addresses across the Internet.

General Vs. Customized Solution

While large services and enterprises may set up dedicate teams to tackle account security with in-house solutions, many small and medium services and enterprises cannot afford to maintain a dedicated team purely for security. With the rapid growth of mobile apps, a large number of app developers are also in urgent need of solutions to enhance their user account security. Meanwhile, trained domain experts in the security area are rare to find, exacerbating the problem. Not surprisingly, the number of attacks and web frauds has been on the rise, even with the growing amount of investment into attack prevention and detection.

The system leverages user login traces, which are readily available to all online services. Without the need of relying on detailed, rich semantics of events, the system can be general across different service sectors and requires relatively little customization for each new customer. A new customer can just plug and play. This feature makes the system scalable to handle a large number of medium or small sized customers.

In addition, since many existing solutions focus more on the application specific data (e.g., transaction details or user post contents) instead of user-login data, the results provided by the system can be complementary to in-house solutions that are already adopted by large online services.

Big Data Analysis Vs. Second or Third Factor Authentication

Conventional solutions that use a second or third factor of authentication (e.g., SMS) aim to prevent attacks. These solutions so far have limited deployment due to the following reasons: First, many attackers can defeat the second factor authentication via resetting the account recovery options or using SMS. Second, many sites cannot afford SMS-based solutions as they are expense. Finally, many users are not adopting these solutions due to the reduced usability.

The big-data approach adopted by the system described in the specification is transparent to users: it does not require users to perform any additional actions. Hence, the system can be deployed more easily. In addition, as attackers constantly seek new methods to evade second or third factor authentications, a detection-based solution is still necessary to identify successful attack attempts. The system can work together with second or third factor authentication solutions to strengthen account security overall.

Example User Interfaces (Visualization of Results)

User interfaces can be provided to visualize the detection results. For example, in some implementations, a web based platform is used to provide the detection results. Below, several example web based user interfaces are described. The example web based user interfaces include four web pages: a general detection statistics, a comparison with manual detection, a visualization of graph-based detection results, and real-time detection results.

Figure 5:
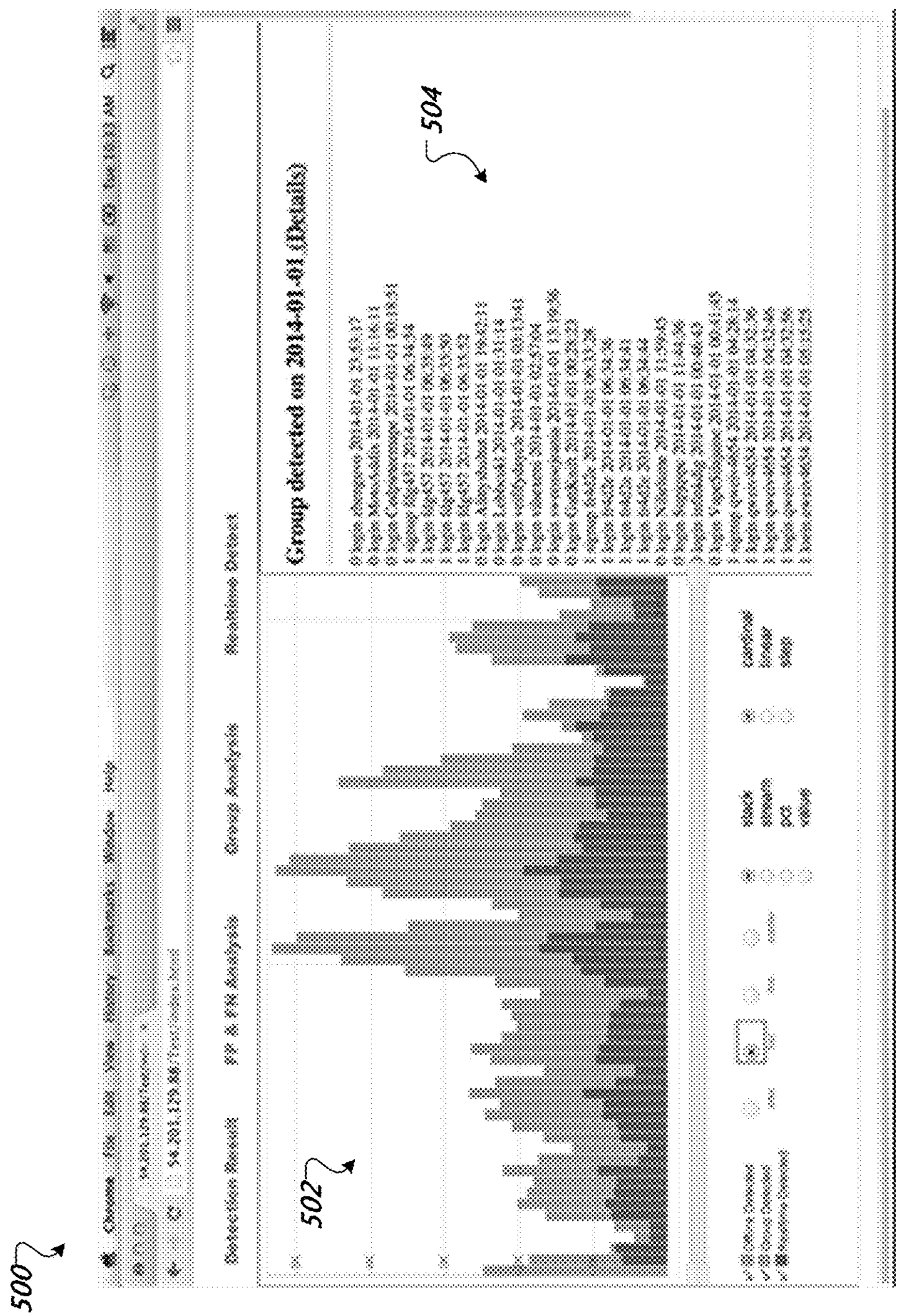
FIG. 5 is an example screenshot of a general detection result page.

FIG. 5 is an example screenshot 500 of a general detection result page. The general detection results page includes a graph 502 that plots the number of malicious events detected by different engines, in this example, the front end real-time engine, the batch graph-based detection, and the offline batch detection engine. When a client selects any of the bars, it will present the detailed detected malicious users and their spam posts detected in a right pane 504.

Figure 6:
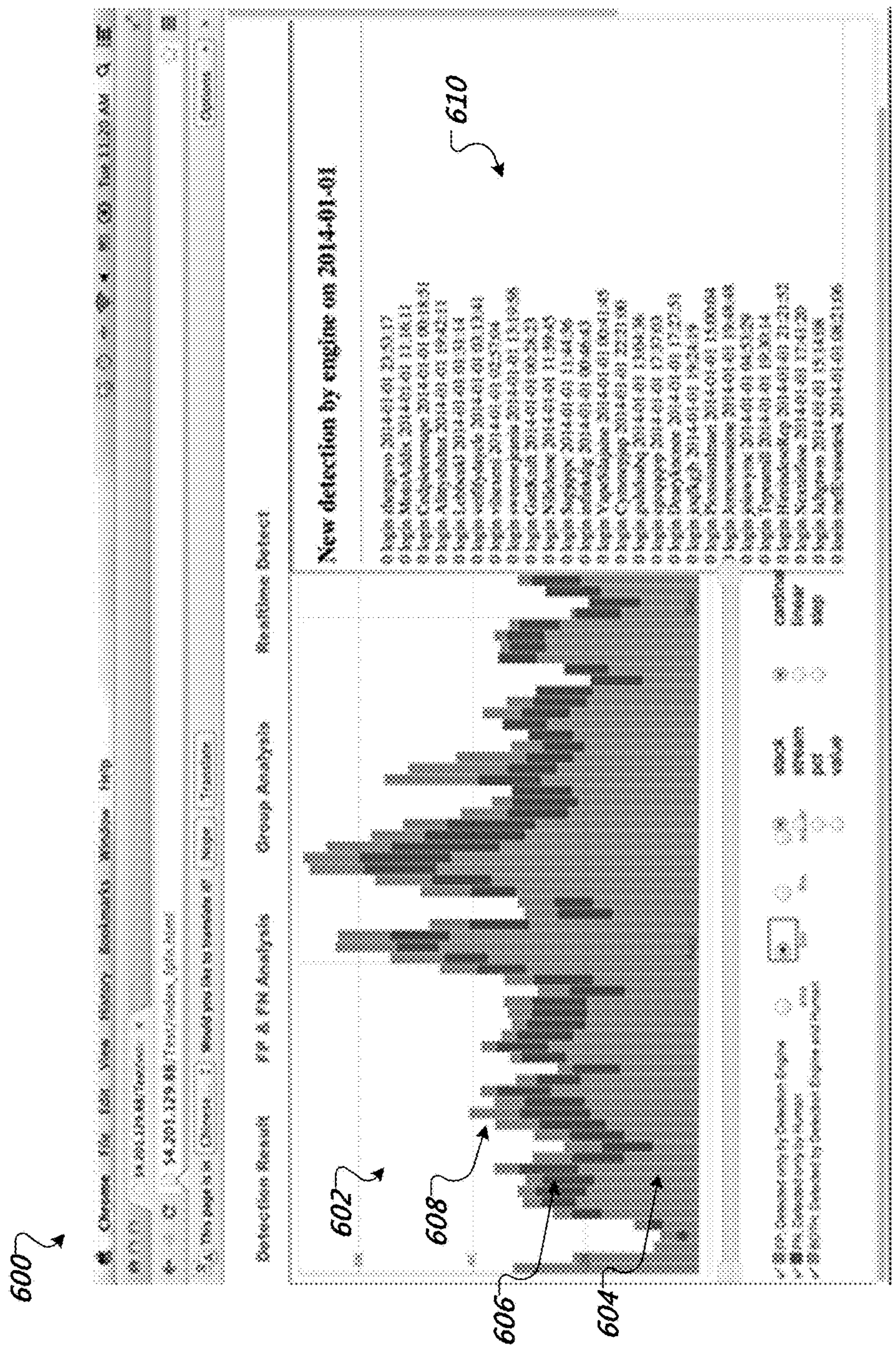
FIG. 6 is an example screenshot of a false positive and false negative web page.

FIG. 6 is an example screenshot 600 of a false positive and false negative web page. The false positive and false negative page shows a comparison of the detection results provided by the automatic detection system with manual detection results. A graph 602 presents the number of events detected both by the automatic detection system and by manual efforts 604, the events detected by manual only 606, and the events by automatic system only 608.

If the client selects a particular bar, a right pane 610 will illustrate the detailed detection results. The screenshot 600 is a result of a selection of a newly detected result. As illustrated by FIG. 6, the detection system can detect malicious users at their signup time, before they post a spamming post. Such early detection ability is not available from manual solutions as they typically rely on the bad posting to detect malicious users.

Figure 7:
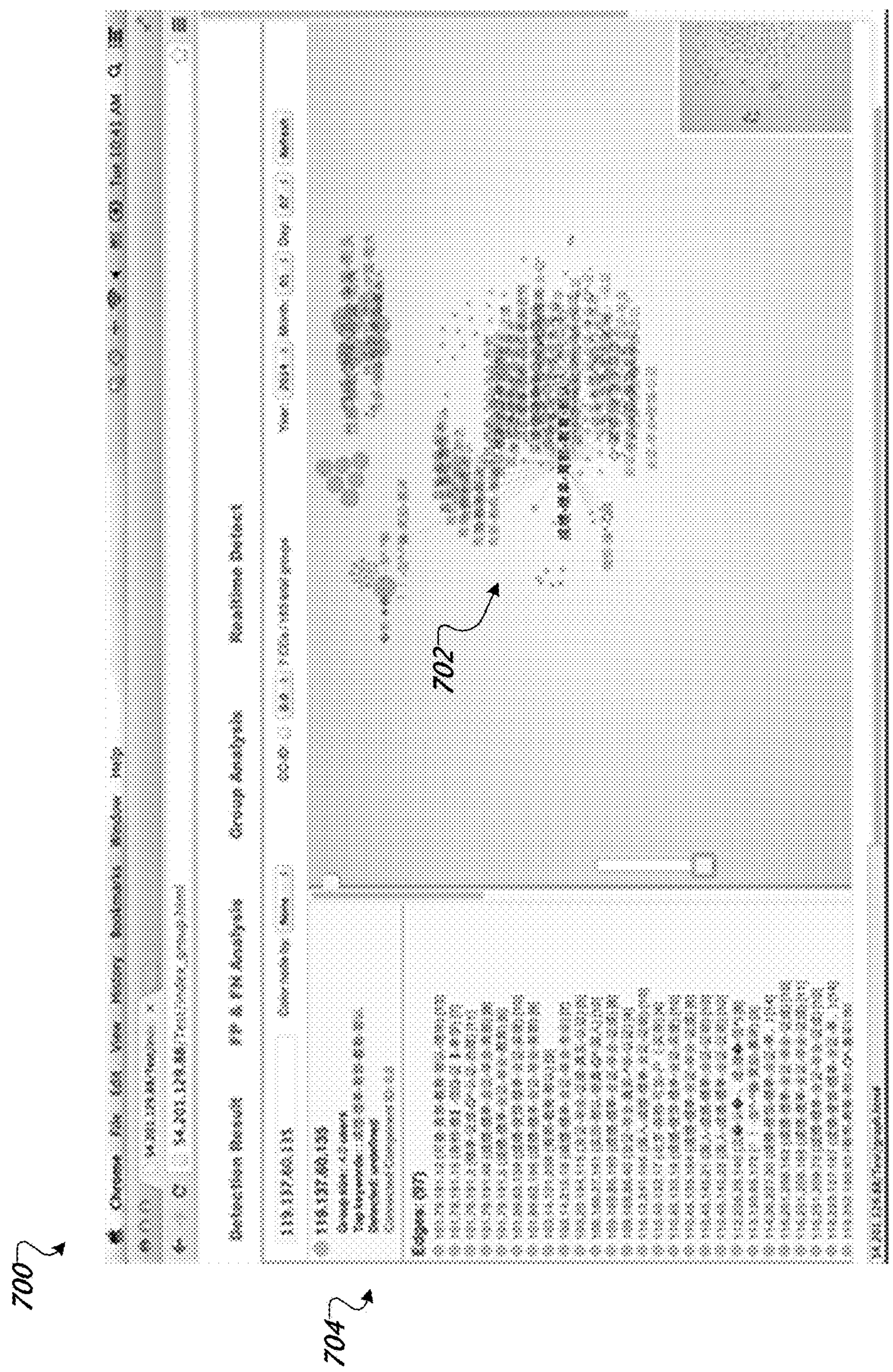
FIG. 7 is an example screenshot of a graph view.

FIG. 7 is an example screenshot 700 of a graph view. The graph 702 is shown on a right pane of the user interface. Each vertex in the graph represents a group of users. Edges of the graph represent a similarity between groups. Different colors can be used to represent different graph communities. Additionally, the vertex size represents the size of the group.

When a client selects a particular vertex, a left pane 704 shows detailed information of the vertex (user group). For example, in FIG. 7, the selected vertex represents a user group that includes of four malicious users. This group is connected to 97 other groups on the graph to form a community. The edges listed on the page show the similar keywords that are shared with other groups.

Figure 8:
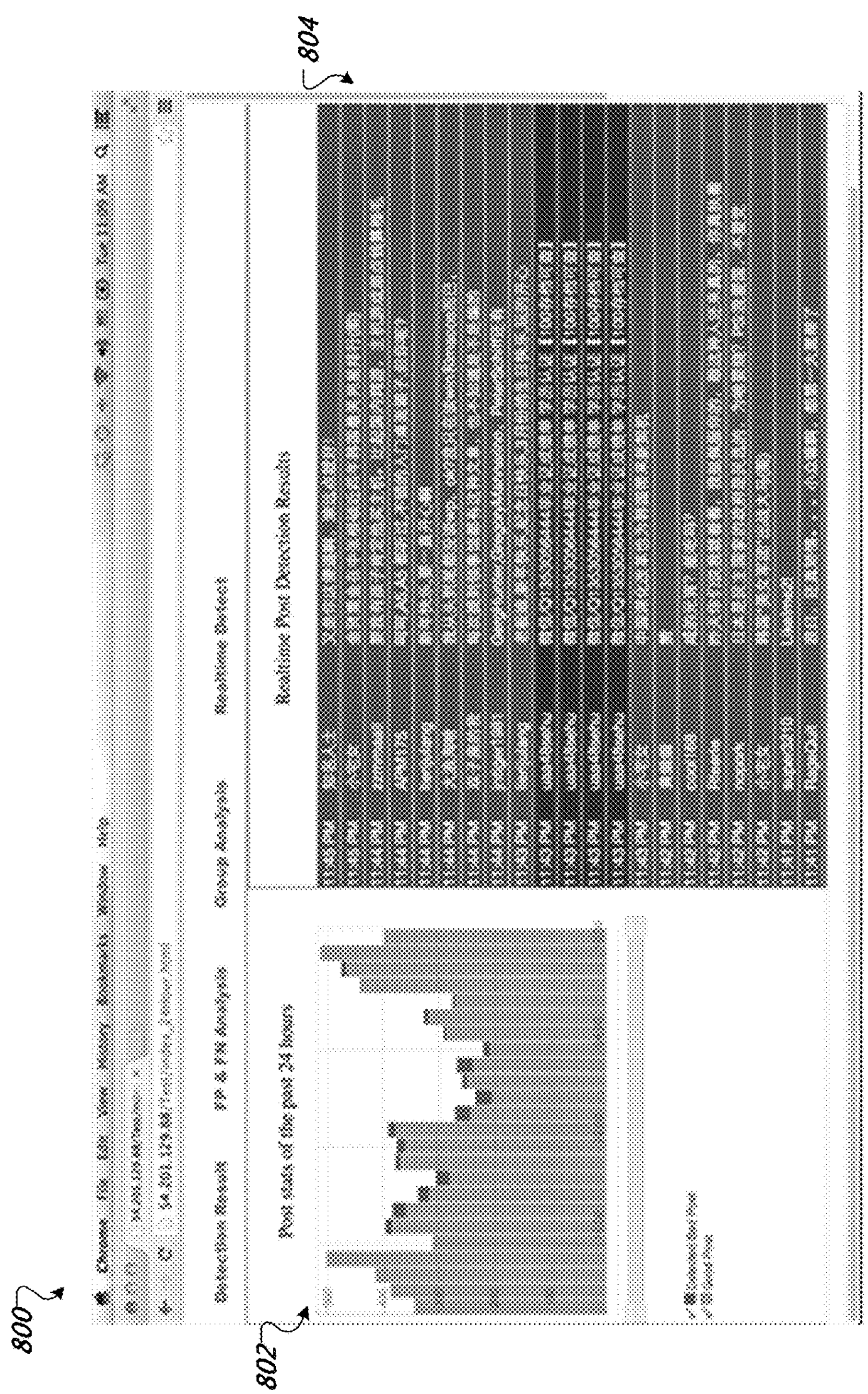
FIG. 8 is an example screenshot of a web page that shows the results of real-time detection engine.

FIG. 8 is an example screenshot 800 of a web page that shows the results of the real-time detection engine. A left pane 802 plots statistics of the past 24 hours. Different colors can be used to represent normal events (e.g., green) and detected malicious events (e.g., red) as different portions of the same graph. On the right side 804 of the page, detection results can scroll in real-time. The results can be color coded, for example, green colored ones are normal posts, while red colored ones are detected malicious posts.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

generating a collection of hypergraphs representing user events across a collection of users, wherein each hypergraph node corresponds to a feature profile computed from a set of correlated events or users and wherein each edge between hypergraph nodes corresponds to attributes specifying a relationship between the hypergraph nodes, wherein generating the collection of hypergraphs includes obtaining event log data associated with the collection of users including one or more of login logs, signup logs, or transaction logs;

analyzing the collection of hypergraphs to determine an initial group of malicious user accounts or account activities satisfying a threshold confidence;

using the initial group of malicious user accounts or account activities as first training data for a machine learning system and a group of user accounts or account activities not identified as malicious as second training data for the machine learning system, wherein the training generates one or more classifiers configured to classify user accounts or account activities as malicious based on feature vectors derived from the first and second training data; and using the one or more generated classifiers on a collection of unclassified user accounts and account activities to output additional malicious user accounts or account activities in addition to those identified in the analysis of the collection of hypergraphs.

2. The method of claim 1, wherein each hypergraph includes nodes corresponding to a feature profile associated with user accounts or events and edges indicating a relationship between nodes.

3. The method of claim 1, wherein analyzing the collection of hypergraphs to determine the initial group of malicious user accounts or account activities comprises:

applying one or more community detection techniques to the hyper graphs to identify suspicious sub-graph components;

determining that the nodes associated with the suspicious sub-graph components are suspicious; and outputting accounts or events associated with the suspicious sub-graph components as candidate malicious accounts or events.

4. The method of claim 3, further comprising examining the candidate accounts or events using a set of one or more rules or a whitelist to filter potential false positive accounts or events.

5. The method of claim 1, wherein analyzing the collection of hypergraphs to determine the initial group of malicious user accounts or account activities comprises:

assigning a suspiciousness score to each node of the hypergraphs, wherein each node corresponds to a feature profile associated with user accounts or events;

applying one or more graph diffusion techniques to the hyper graphs; and selecting a set of one or more nodes with high suspiciousness scores as candidate malicious accounts or events.

6. The method of claim 1, wherein using the group of malicious user accounts or account activities as training data for a machine learning system that generates one or more classifiers further includes obtaining additional user accounts or account activities to use as good training data.

7. The method of claim 6, wherein the good training data and group of malicious user accounts or account activities are used to derive a set of rich features used to generate the one or more classifiers.

8. The method of claim 1, further comprising using the output additional malicious user accounts or account activities to derive a set of signals to combine with the one or more classifiers to provide real-time detection of future user events or user accounts.

9. A system comprising:

one or more computers configured to perform operations comprising:

generating a collection of hypergraphs representing user events across a collection of users, wherein each hypergraph node corresponds to a feature profile computed from a set of correlated events or users and wherein each edge between hypergraph nodes corresponds to attributes specifying a relationship between the hypergraph nodes, wherein generating the collection of hypergraphs includes obtaining event log data associated with the collection of users including one or more of login logs, signup logs, or transaction logs;

analyzing the collection of hypergraphs to determine an initial group of malicious user accounts or account activities satisfying a threshold confidence;

using the initial group of malicious user accounts or account activities as training data for a machine learning system and a group of user accounts or account activities not identified as malicious as second training data for the machine learning system, wherein the training generates one or more classifiers configured to classify user accounts or account activities as malicious based on feature vectors derived from the first and second training data; and using the one or more generated classifiers on a collection of unclassified user accounts and account activities to output additional malicious user accounts or account activities in addition to those identified in the analysis of the collection of hypergraphs.

10. The system of claim 9, wherein each hypergraph includes nodes corresponding to a feature profile associated with user accounts or events and edges indicating a relationship between nodes.

11. The system of claim 9, wherein analyzing the collection of hypergraphs to determine a group of malicious user accounts or account activities comprises:

applying one or more community detection techniques to the hyper graphs to identify suspicious sub-graph components;

determining that the nodes associated with the suspicious sub-graph components are suspicious; and outputting accounts or events associated with the suspicious sub-graph components as candidate malicious accounts or events.

12. The system of claim 11, further comprising examining the candidate accounts or events using a set of one or more rules or a whitelist to filter potential false positive accounts or events.

13. The system of claim 9, wherein analyzing the collection of hypergraphs to determine a group of malicious user accounts or account activities comprises:

assigning a suspiciousness score to each node of the hypergraphs, wherein each node corresponds to a feature profile associated with user accounts or events;

applying one or more graph diffusion techniques to the hyper graphs; and selecting a set of one or more nodes with high suspiciousness scores as candidate malicious accounts or events.

14. The system of claim 9, using the group of malicious user accounts or account activities as training data for a machine learning system that generates one or more classifiers further includes obtaining additional user accounts or account activities to use as good training data.

15. The system of claim 14, wherein the good training data and group of malicious user accounts or account activities are used to derive a set of rich features used to generate the one or more classifiers.

16. The system of claim 9, further configured to perform operations comprising using the output additional malicious user accounts or account activities to derive a set of signals to combine with the one or more classifiers to provide real-time detection of future user events or user accounts.

* * * * *